May 12, 1970  L. B. ROOF  3,511,080
VALVELESS SYSTEM FOR TRANSFERRING SAMPLE FROM SAMPLE
LOOP THROUGH COLUMN TO DETECTOR
Filed March 3, 1967

INVENTOR.
L. B. ROOF
BY Young & Quigg
ATTORNEYS

# United States Patent Office 3,511,080
Patented May 12, 1970

3,511,080
VALVELESS SYSTEM FOR TRANSFERRING SAMPLE FROM SAMPLE LOOP THROUGH COLUMN TO DETECTOR
Lewis B. Roof, Bartlesville, Okla., assignor to Phillips Petroleum Company, a corporation of Delaware
Filed Mar. 3, 1967, Ser. No. 620,507
Int. Cl. G01n 31/08, 1/10
U.S. Cl. 73—23.1             3 Claims

ABSTRACT OF THE DISCLOSURE

In a chromatographic analysis system having in series a sample loop, chromatographic column and a detector, the improvement comprising eliminating any valve between the loop and the detector. This results in greater accuracy by eliminating flow upsets and variations in flow to the chromatographic column and to the detector downstream of the column, due to moving parts or moving gas streams necessary in the prior art in the operation of a valve between the loop and the column.

---

Figure 2:
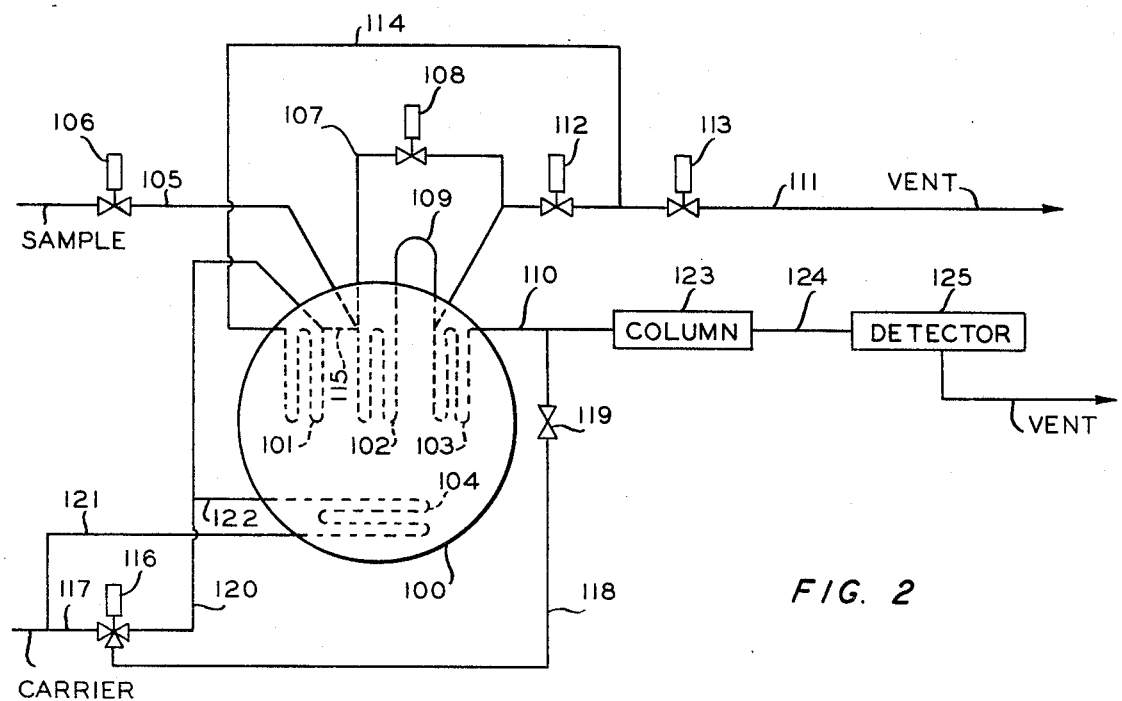

This invention relates to chromatography. In another aspect, this invention relates to a novel method of and apparatus for obtaining uniform fluid samples for chromatographic analysis.

Gas chromatography is a known method of analyzing fluid samples by preferential sorption and desorption. In sorption chromatography, a column containing an appropriate sorbent, usually in granular form, is used to separate the various components of a fluid sample.

Conventionally, as the separated constituents emerge from the sorbent-packed columns, they are suitably detected through the sensing of a characteristic property, such as thermal conductivity, density, refractive index, infrared adsorption, and the like, which detect the presence of the several compounds and measure the relative amounts thereof.

The desirability of using chromatography for such specific uses as fractionation control has been recognized for some time. Certain features of process chromatography, such as specific measurement, high sensitivity and simplicity of operation makes this type of analyzer very attractive for use in automatic process control.

Conventionally, chromatographic sampling involves the use of a valve mechanism having several moving parts, typically a rotating mechanism or the like, to trap a volume of sample fluid which flows therethrough. Thus, by the result of mechanical action in the valve, the inlet and outlet ports of a sample tube having a sample fluid flowing therethrough are simultaneously sealed to trap a predetermined volume of sample fluid therein.

Since the volume of a vaporous sample fluid varies greatly with temperature and pressure variations, it is necessary that the conventional sample valve be enclosed in a closely controlled temperature zone. Also, many of these mechanical type sample valves have a flexible diaphragm therein and normally in contact with the sample fluids, and when analyzing low pressure vaporous samples, contaminants from the air many times diffuse through the diaphragm into the sample fluid therein. In addition, the use of these mechanical type sample valves many times result in unusually large flow upsets and variations to the chromatographic column and the respective detector.

Therefore, there is needed a chromatographic sampling system which utilizes no moving parts that are subject to close temperature control, no valve diaphragm, and that provides a minimum of flow upsets during the sampling operation.

In accordance therewith, the object of this invention is to provide a novel method of and apparatus for obtaining vaporous samples to be utilized in chromatographic analysis.

According to one embodiment of this invention, there is provided a method of obtaining fluid samples for chromatographic analysis comprising passing a fluid sample stream through a temperature controlled sample isolation zone against a first predetermined pressure. The flow of the sample stream is then stopped to isolate the sample in the sample isolation zone at a second predetermined pressure. The isolated sample within the sample isolation zone is next allowed to come to equilibrium against a third predetermined pressure to obtain a uniform volume of sample within the sample isolation zone at the desired temperature. It is normally preferred that the third predetermined pressure be greater than the second predetermined pressure so that a portion of the isolated sample will escape from the sample trapping zone to yield a predetermined amount of sample within this sample isolation zone.

According to another embodiment of this invention, a chromatographic sampling apparatus is provided having a sample loop with first and second openings having first and second flow restriction means positioned respectively near each of said openings. A sample introduction conduit and a first carrier gas conduit communicate directly with the first flow restriction means, and a second carrier gas conduit and an exhaust conduit communicate directly with the said second flow restriction means. Various embodiments of this basic apparatus are also provided.

Figure 1:
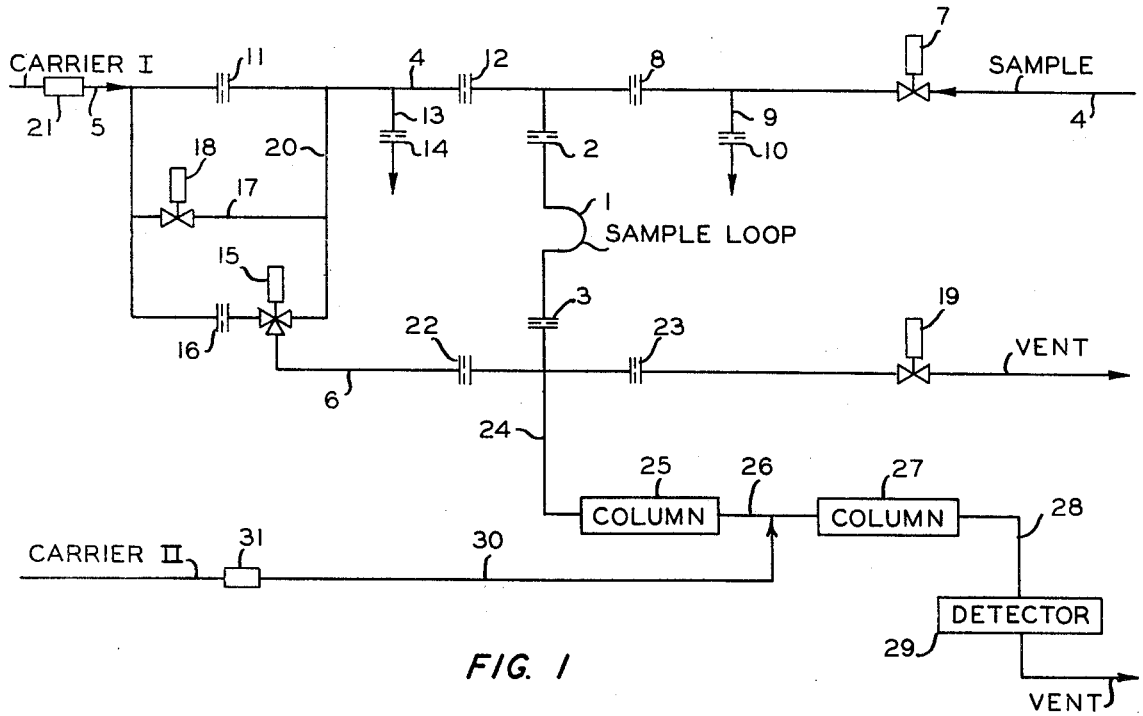

This invention can be understood more easily from a study of the drawings in which:

FIG. 1 is a schematic illustration of the preferred apparatus of this invention;
FIG. 2 is a schematic illustration of another embodiment of this invention.

Now, referring to the drawing and in particular to FIG. 1, there is shown a schematic illustration of the preferred embodiment of this invention whereby a predetermined amount of the gaseous sample or a vaporous sample containing entrained liquid, etc., can be measured and isolated by controlling the flow rate and pressure of the sample fluid and carrier fluid entering and leaving the sample isolation zone. Sample loop 1 which normally has an internal volume from .01 to 1 cubic centimeter has flow restrictors 2 and 3 positioned near its inlet and outlet, respectively. Sample loop 1, and flow restrictors 2 and 3, are in turn positioned between conduits 4 and 6 as illustrated in FIG. 1. Conduit 4 has flow restrictors 8, 11 and 12 operatively positioned therein. Valve 7 regulates the flow of sample fluid thereto. Also, conduits 9, 13 and 20 communicate with conduit 4 as illustrated in FIG. 1. Flow restrictors 10 and 14 are positioned in conduits 9 and 13, respectively, so as to regulate the pressure within conduit 4. Conduit 4 also communicates with conduits 5, 17 and 20 at the conduit junction as illustrated in FIG. 1. Conduit 5 has pressure regulator 21 positioned therein which controls the flow of the carrier gas I stream to the system. Conduit 20 has flow resistor 16 and three-way valve 15 positioned therein. Conduit 17 has valve 18 positioned therein.

Conduit 6 extends from one port of three-way valve 15 and has flow restrictors 22 and 23 and vent valve 19 positioned therein. Conduit 24 communicates with conduit 6 at a point between flow restrictors 22 and 23 and communicates also with chromatographic column 25. Conduit 26 communicates between chromatographic column 25 and chromatographic column 27, and conduit 28 communicates between chromatographic column 27 and detector 29. Carrier gas II (flushing gas) conduit 30 having the pressure regulator 31 positioned therein communicates with conduit 26.

The flow restrictors illustrated in FIG. 1 can be any type flow restriction device known in the art such as orifices, capillary tubes, etc. For the purpose of this application, the term "resistance to flow" is defined as the ratio of the pressure drop over the volumetric flow of the fluid flowing through a resistance or restriction, i.e., p.s.i./cc./min. Referring now to the flow restrictors in FIG. 1, it is generally preferred that the restrictors 2 and 3 have approximately the same "resistance to flow," that restrictors 8, 12, 22 and 23 have approximately the same "resistance to flow," that restrictors 10 and 14 have approximately the same "resistance to flow," and that restrictors 11 and 16 have approximately the same "resistance to flow." Also, it is preferred that restrictors 10 and 14 have from 5 to 20 times and preferably 10 times the "resistance to flow" as restrictors 2 and 3, and from 100 to 400 times and preferably 200 times the "resistance to flow" as restrictors 8, 12, 22 and 23. Also, it is desired that restrictors 11 and 16 have from 100 to 400 and preferably about 200 times the "resistance to flow" as restrictors 10 and 14. It is also desired that all the restrictors and especially restrictors 8, 12, 22 and 23 have a maximum internal diameter of .005 inch in order to keep diffusion within acceptable limits.

Valves 7, 15, 18, and 19 as illustrated in FIG. 1 are shown as solenoid operated valves; however, any type valve operating mechanisms known in the art can be used with this sampling system. The use of solenoid valves as illustrated in FIG. 1 facilitates automatic operation whereby the solenoids are sequentially operated by a programmer or timing device (not shown in FIG. 1). Chromatographic columns 25 and 27 and detector 29 can be any type of chromatographic columns and detector known in the art. For the purpose of this preferred embodiment, chromatographic column 25 is illustrated as a splitter column for the purpose of sorbing a group of relatively nonvolatile, highly sorbed sample components, and chromatographic column 27 is shown as a secondary elution column for sorbing a more volatile group of components of which it is desired to further separate and to analyze.

Now referring to the operation of the apparatus of FIG. 1, the sampling operation will be discussed in relation to three steps; flushing, sample trapping, and elution. The sample gas is supplied to valve 7 at a pressure greater than ½ p.s.i.g. Carrier I is supplied from regulator 21 at 60 p.s.i.g. and carrier II is supplied from pressure regulator 31 at 40 p.s.i.g. It is understood that sample loop 1 is placed in a temperature controlled zone such as a temperature controlled chromatographic zone (not shown in FIG. 1) and that valves 7, 15, 18, and 19 and pressure regulators 21 and 31 can be maintained at ambient temperatures outside the said temperature controlled chromatographic zone. The flow restrictors as illustrated in FIG. 1 have the following restrictive properties:

| Resistors: | "Resistance to flow" (p.s.i./cc./min.) |
| --- | --- |
| 8, 12, 22 and 23 | 0.02 |
| 2 and 3 | 0.1 |
| 10 and 14 | 1.0 |
| 11 and 16 | 200.0 |

FLUSHING

During the step, valve 19 is open, valve 18 closed, and valve 15 is placed in a first position which allows conduit 5 through restrictor 16 to communicate with conduit 6. Valve 7 is opened so that sample gas flows therethrough at 12 cc./min. Carrier I flows at .6 cc./min. of which .3 cc./min. passes through restrictors 11 and 16, respectively. Also, carrier II flows at 180 cc./min., 120 of which flows backwards through column 25 and 60 of which flows forward through column 27 as a flushing medium. The sample gas flow is as follows, 1 cubic centimeter per minute flows out through conduits 9 and 13, respectively, and 10 cc./min. flows through sample loop 1 and out through vent valve 19. The small carrier I flow is necessary to keep portions of conduit 4 and conduit 6 purged. Thus, .3 cc./min. of carrier I flows out through conduit 13 and vent valve 19, respectively. As stated, carrier II serves to back flush column 25 and forward flush column 27, 120 cubic centimeters per minute of carrier II flowing out through vent valve 19, and 60 cubic centimeters per minute of carrier II flowing out through detector 29. This flushing step is continued as long as desired, normally for a programmed flushing time sufficient, not only to fill the sample loop with fluid, but to flush the columns so that reproducible results for succeeding runs can be had.

SAMPLING

To take the sample, valves 7 and 19 are closed. Valve 15 is then placed in its second position so that conduit 6 communicates with conduit 20. A fraction of a second later, valve 18 is operated to thereby allow 180 cc./min. of carrier I to flow therethrough and into conduits 4 and 6. Carrier I will pass through restrictors 10 and 14 at a combined rate of about 120 cc./min. and from conduit 6 out conduit 24 to chromatographic columns 25 and 26 at a rate of about 60 cc./min. This latter step will pressurize the system, isolate the sample within sample loop 1 and in general prepare the chromatographic apparatus for elution.

ELUTION

In a few seconds after the system is pressurized as stated above, valve 15 is placed in its first position. Carrier I flows into conduit 4 via conduit 17 at about 180 cc./min. A very small flow, about .06 cc./min. of carrier I, will flow from valve 15 into conduit 6. Of the carrier I flow in conduit 4, 60 cc./min. will flow out conduit 13, 60 cc./min. will flow out conduit 9, and 60 cc./min. will flow through sample loop 1 and elute the sample trapped therein, out conduit 24 into chromatographic column 25.

Thus, it is readily seen that a uniform sample is taken by the sampling system with a minimum of flow upsets without the use of a diaphragm valve and without the use of any valve mechanism in a temperature controlled zone.

It must be noted that the apparatus as illustrated in FIG. 1 is a preferred apparatus designed to accomplish this novel differential pressure supply method. However, the basic sampling operation can be carried out in a modified apparatus of FIG. 1. For example, restrictors 8, 12, 22 and 23 can be removed from conduits 4 and 6 and a different valving means can be utilized instead of valves 15 and 18 at the outlets thereof in order to supply carrier gas thereto. Also, it is readily seen with this arrangement that conduit 24 and valve 19 are not necessary to obtain uniform samples from sample loop 1. When this is done, it is preferred that restrictors 2 and 3 have a maximum internal diameter of .005 inch to prevent diffusion to and from sample loop 1. Therefore, it is evident that one skilled in the art can make many modifications of this basic apparatus from a study of this disclosure. Another embodiment of the apparatus is illustrated in FIG. 2.

FIG. 2 is an embodiment of the apparatus of this invention wherein the fixed fluid restrictors 101, 102, 103 and 104 are contained within a body 100. These restrictors can be slots of the proper dimensions required to produce the desired pneumatic resistance formed by sealing two slotted plates together. It is desired that restrictor 104 have from 100 to 400 times and preferably 200 times the "resistance to flow" as restrictor 101. Also, it is desired that restrictor 101 have from 2 to 10 and preferably five times the "resistance to flow" as restrictor 102, and from 1 to 4 times and preferably two times the "resistance to flow" as restrictor 103. It is also preferred that the maximum internal diameter of all the restrictors, especially restrictors 102 and 103, be .005 inch to prevent diffusion into and out of sample loop 109.

As shown in FIG. 2, sample conduit 105, having valve 106 positioned therein, communicates with restrictor 102. Conduit 107, having valve 108 positioned therein, communicates between restrictor 102 and restrictor 103. Restrictor 103 is positioned between sample loop 109 and conduit 110. Conduit 111 communicates with conduit 107 and has valves 112 and 113 positioned therein. Conduit 114 communicates between restrictor 101 and conduit 111 at a point between valves 112 and 113. Internal conduit 115 communicates between restrictor 101 and restrictor 102. One port of three-way valve 116 communicates with carrier conduit 117. Another port of three-way valve 116 communicates with conduit 118 which in turn connects to conduit 110. Variable restrictor 119 is positioned within conduit 118. Conduit 120 communicates between the third port of three-way valve 116 and internal conduit 115. Conduit 121 communicates between conduit 117 and restrictor 104. Conduit 122 communicates between restrictor 104 and conduit 120.

The operation of the apparatus illustrated in FIG. 2 is similar to the operation of the apparatus illustrated in FIG. 1. Therefore, the operation of the apparatus of FIG. 2 will be described in relation to three steps; flushing, sampling and elution.

FLUSHING

With sample gas being supplied to valve 106 and carrier gas being supplied to valve 116, valve 106 is first opened along with valves 112 and 113, while valve 108 able restrictor 119 is adjusted so that a small portion of that conduit 117 communicates with conduit 118. Variable restrictor 119 is adjusted so that a small portion or carrier gas passes through restrictor 103 and into conduit 111 and the greater portion will pass into chromatographic column 123. It is desired that this last portion be constant through all the flushing, sampling and elution operations so that a minimum of flow variations will pass to detector 125. Carrier gas also flows from conduit 121 to restrictor 104, restrictor 101, conduit 114, and into conduit 111. Sample fluid flows through conduit 105 to restrictor 102, sample loop 109, and into conduit 111. A flow of carrier gas through restrictor 103 is sufficient to prevent samples from flowing into 103 and subsequently into column 123. The flow of carrier gas from conduit 121 is sufficient to prevent samples from flowing through restrictor 191, conduit 114, and out conduit 111 by the route.

SAMPLING

To take a sample, valve 106 is closed to isolate sample fluid within the sample loop 109. Valve 108 is then opened to thereby allow the sample in sample loop 109 to bleed to atmospheric pressure. Next, valve 116 is placed in a second position to allow conduit 117 to connect to conduit 120, and the valve 113 is closed. This action will allow carrier gas to flow through conduits 107 and 114 into restrictor 103 and into conduit 110 to thereby pressurize the sample within sample loop 109.

It is again noted that the carrier gas flow into conduit 110 at this time is substantially the same as the carrier gas flow into conduit 110 was in the flushing step.

ELUTION

After sample loop 109 has been pressurized by the action of the carrier gas flowing through conduit 120, valves 112 and 108 are closed. This action will cause the carrier gas from conduit 120 to pass through restrictor 102, sample loop 109, restrictor 103, conduit 110 and into the chromatographic column 103. Thus, this flow of carrier gas will flush the entrapped sample from sample loop 109 into chromatographic column 123.

When utilizing the apparatus of FIG. 2 as when utilizing the apparatus of FIG. 1, valves 106, 112, 113, 108 and 116 and variable restrictor 119 need not be in a temperature controlled zone. It is desirable only that body 100 with sample loop 109 be placed within a temperature controlled zone (not shown in FIG. 2), such as the temperature controlled chromatographic zone that normally encloses chromatographic column 123. Also, even though a variety of resistances and flow rates and pressures can be utilized within the inventive apparatus of FIG. 2, it is preferred that the sample fluid be supplied at a pressure greater than ½ pound per square inch gauge and that the carrier fluid be supplied at a pressure around 60 pounds per square inch gauge. With these pressures, ideal results have been produced when restrictor 101 had a "resistance to flow" of 1 p.s.i./cc./min., restriction 102 had a "resistance to flow" of .2 p.s.i./cc./min., restriction 103 had a "resistance to flow" of .5 p.s.i./cc./min., restriction 104 had a "resistance to flow" of 200 p.s.i./cc./min. and variable resistance 119 had a resistance to flow during the flushing step of 200 p.s.i./cc./min.

From the above disclosure, it is apparent that many variations can be made of the apparatus of this invention for the particular embodiments disclosed in the drawing and discussed in this specification are not intended to limit the scope of this invention.

I claim:

1. In a chromatographic analysis system, the combination comprising:
   (a) a main flow line containing a sample loop, a first flow restrictor, a chromatographic column, and a chromatographic peak detector connected directly in series in said main flow line without any flow-interrupting devices between them;
   (b) a sample gas supply line connected by a valve and a second flow restrictor in series to the main flow line on the side of said sample loop opposite to the side connected to said column;
   (c) a first vent line connected by a valve to said main flow line between said first flow restrictor and said column;
   (d) a carrier gas supply line connected by a first branch line to one side of said sample loop through said second restrictor and by a second branch line to the second side of said sample loop through said first restrictor, said second branch line having valve means therein to permit flow to be shut off through said second branch line; and
   (e) a second vent line connected by a third flow restrictor to said sample gas supply line between the valve therein and said second restrictor.

2. The combination of claim 1 in which the chromatographic column is made in two sections in series and a second carrier gas conduit is connected into the main flow line between the two sections of the column so the upstream section can be back flushed with the second carrier gas to the vent while the downstream section is flushed downstream through the detector to a vent.

3. A method of passing uniform gas samples into a chromatographic column comprising the following steps:
   (a) flowing a sample of a sample gas through a sample zone at a first pressure in a temperature controlled isolation zone by constantly adding sample gas to said sample zone at one end and venting it from said sample zone at the other end;
   (b) cutting off the sample gas flow and isolating a sample in said sample zone by passing carrier gas to both ends of said sample zone at a second pressure above said first pressure; and
   (c) thereafter discontinuing the passage of carrier gas to both ends of said sample zone at said second pressure and passing carrier gas through said sample zone to force the isolated sample from said sample zone directly into a chromatographic column and directly into a chromatographic peak detector without passage through any flow-interrupting device.

References Cited

UNITED STATES PATENTS 2,964,938  12/1960  Fuller _____ 73—23

3,357,233  12/1967  Roof _____ 73—23.1

CHARLES A. RUEHL, Primary Examiner

E. J. KOCH, Assistant Examiner

U.S. Cl. X.R.

73—422